United States Patent [19]
Houghton

[11] Patent Number: 5,892,874
[45] Date of Patent: Apr. 6, 1999

[54] ABRASION RESISTANT SUBMARINE CABLE ARRANGEMENT

[75] Inventor: Ian Houghton, Sydney, Australia

[73] Assignee: Alcatel Alsthom Compagnie Generale d'Electricite, Paris, France

[21] Appl. No.: 894,281

[22] PCT Filed: Dec. 16, 1996

[86] PCT No.: PCT/EP96/05843

§ 371 Date: Aug. 14, 1997

§ 102(e) Date: Aug. 14, 1997

[87] PCT Pub. No.: WO97/22899

PCT Pub. Date: Jun. 26, 1997

[30] Foreign Application Priority Data

Dec. 20, 1995 [AU] Australia .................................. PN7228
Sep. 3, 1996 [AU] Australia .................................. PO2076

[51] Int. Cl.$^6$ .................................................. H01B 11/22
[52] U.S. Cl. .............................................. 385/113; 385/101
[58] Field of Search ........................... 385/101, 109–113

[56] References Cited

U.S. PATENT DOCUMENTS

| | | | |
|---|---|---|---|
| 4,552,432 | 11/1985 | Anderson et al. ................... | 350/96.23 |
| 5,212,755 | 5/1993 | Holmberg ............................... | 385/107 |
| 5,224,190 | 6/1993 | Chu et al. ................................ | 385/107 |
| 5,408,560 | 4/1995 | Seynhaeve et al. .................... | 385/101 |
| 5,463,711 | 10/1995 | Chu ......................................... | 385/101 |

FOREIGN PATENT DOCUMENTS

| | | | |
|---|---|---|---|
| 0321262 | 6/1989 | European Pat. Off. ............... | 385/101 |
| 0710862 | 10/1995 | European Pat. Off. ............... | 385/101 |
| 3706740 | 9/1988 | Germany ................................ | 385/101 |

*Primary Examiner*—John D. Lee
*Assistant Examiner*—Victoria D. Hao
*Attorney, Agent, or Firm*—Ware, Fressola, Van Der Sluys & Adolphson LLP

[57] ABSTRACT

An electric and/or optical submarine cable arrangement which bridges the weight/strength gap that exists between armoured and unarmoured cable. A stranded armour layer (6) comprises alternate strands of steel wire (7) and polymeric filler (8). Such a cable has sufficient strength to support a section of heavy armoured cable joined to it during laying in water of a depth exceeding 2 km, but light enough that an unarmoured cable can support it in deep water.

16 Claims, 4 Drawing Sheets

ABRASION RESISTANT SUBMARINE CABLE ARRANGEMENT

TECHNICAL FIELD

This invention relates to submarine cable, and in particular to an abrasion resistant submarine cable arrangement suitable for laying in water exceeding 2 km in depth.

BACKGROUND OF THE INVENTION

Known abrasion resistant cable, such as steel wire armoured cable, has good abrasion resistance and is strong enough to be suspended from a cable laying vessel during laying in water deeper than 5 km.

Such abrasion resistant cable is conventionally used when the section of seabed upon which the cable is being laid includes a zone of abrasion risk.

Once the zone of abrasion risk is passed, abrasion resistant cable is no longer needed; continuing the abrasion resistant cable beyond this zone would be prohibitively expensive. The abrasion resistant cable therefore needs to be connected, by joint or transition, to a cheaper, but lighter and consequently weaker, conventional un-armoured cable.

However, deeper than about 2 km, generally the weight of steel armoured cable is too great to safely permit it to be supported during suspension by the weaker unarmoured cable joined thereto. This means that it is not possible to directly lay from armoured to un-armoured, or recover from un-armoured to armoured cable.

It is still possible to install the armoured cable in water deeper than 2 km, using an appropriate installation sequence where the strong armoured cable always supports the weaker un-armoured cable, and never vice-versa. However, such a sequence requires good weather, additional joints, cable and considerable time. It is accordingly both risky and expensive.

SUMMARY OF THE INVENTION

It is an object of the present invention to provide an armoured cable arrangement which, on the one hand, is light enough that an un-armoured cable can support it in deep water, and on the other hand has abrasion resistance comparable to conventional steel wire armoured cable, and sufficient strength to support heavy armoured cable.

According to the invention there is provided an electric and/or optical cable arrangement including at least one stranded armour layer comprising a plurality of metallic wire elements and a plurality of filler elements, wherein said filler elements are of a material that has a lower weight per unit length in relation to the weight per unit length of the material of the said wire elements.

BRIEF DESCRIPTION OF THE DRAWINGS

In order that the invention may be readily carried into effect, an embodiment thereof will now be described in relation to the accompanying drawings, in which.

BEST MODE FOR CARRYING OUT THE INVENTION

Figure 1:
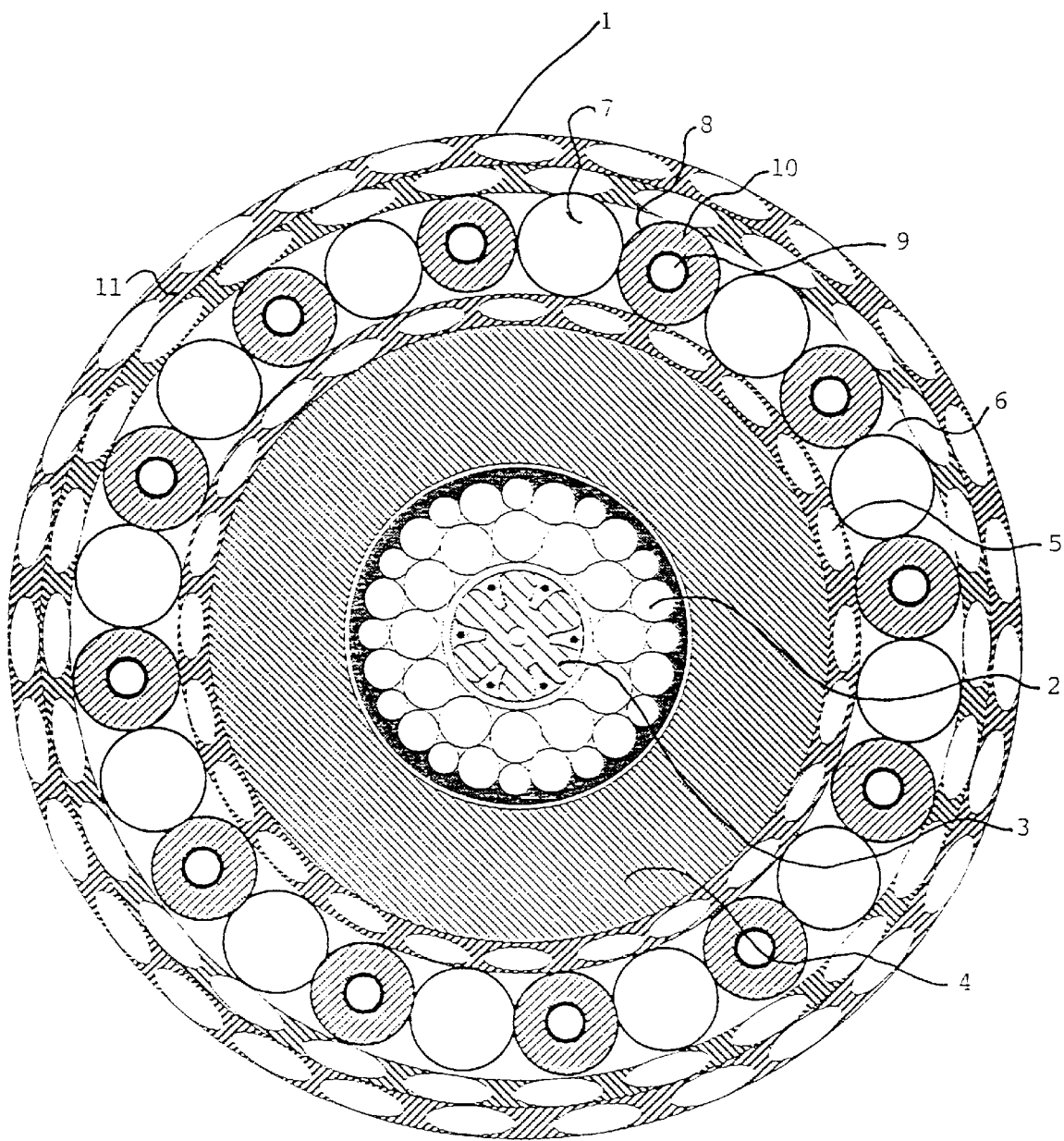
FIG. 1 shows the cross-section of the cable arrangement of the present invention.

Referring to FIG. 1, the cable 1 comprises a conventional vault arrangement 2 surrounding an array of six optical fibres 3. Vault 2 is surrounded by a polyethylene layer 4 which in turn is surrounded by a layer consisting of polypropylene yarn and bitumen 5. The characteristic armour layer 6 comprises an arrangement of 12×3.4 mm steel wires 7 and 12×3.4 mm fillers 8. Each filler comprises a 0.65 mm steel core wire 9 coated to 3.4 mm with polyvinyl chloride (PVC) 10. The coating of PVC is attached to the core wire 9 by an adhesive (not shown) such as, for example, a solvent based elastomeric nitrile. Steel wires 7 and fillers 8 alternate.

A high density polyethylene coating or a polyurethane coating may substitute the PVC coating 10, in which case suitable adhesives would be required.

Armour layer 6 is covered with an outer sheath 11 of polyisopropylene and bitumen.

Because some of the steel armour wires have been replaced by fillers, the weight and strength of the cable is reduced. Since the original steel armoured cable was much stronger than necessary, a significant reduction of strength is possible without compromising the ability of the cable to support its own weight in deep water.

Removal of steel wires also reduces torque, which improves performance, increasing the depth capability for operations where torque damage to transitions between armoured and unarmoured cable is a limiting factor.

Figure 2:
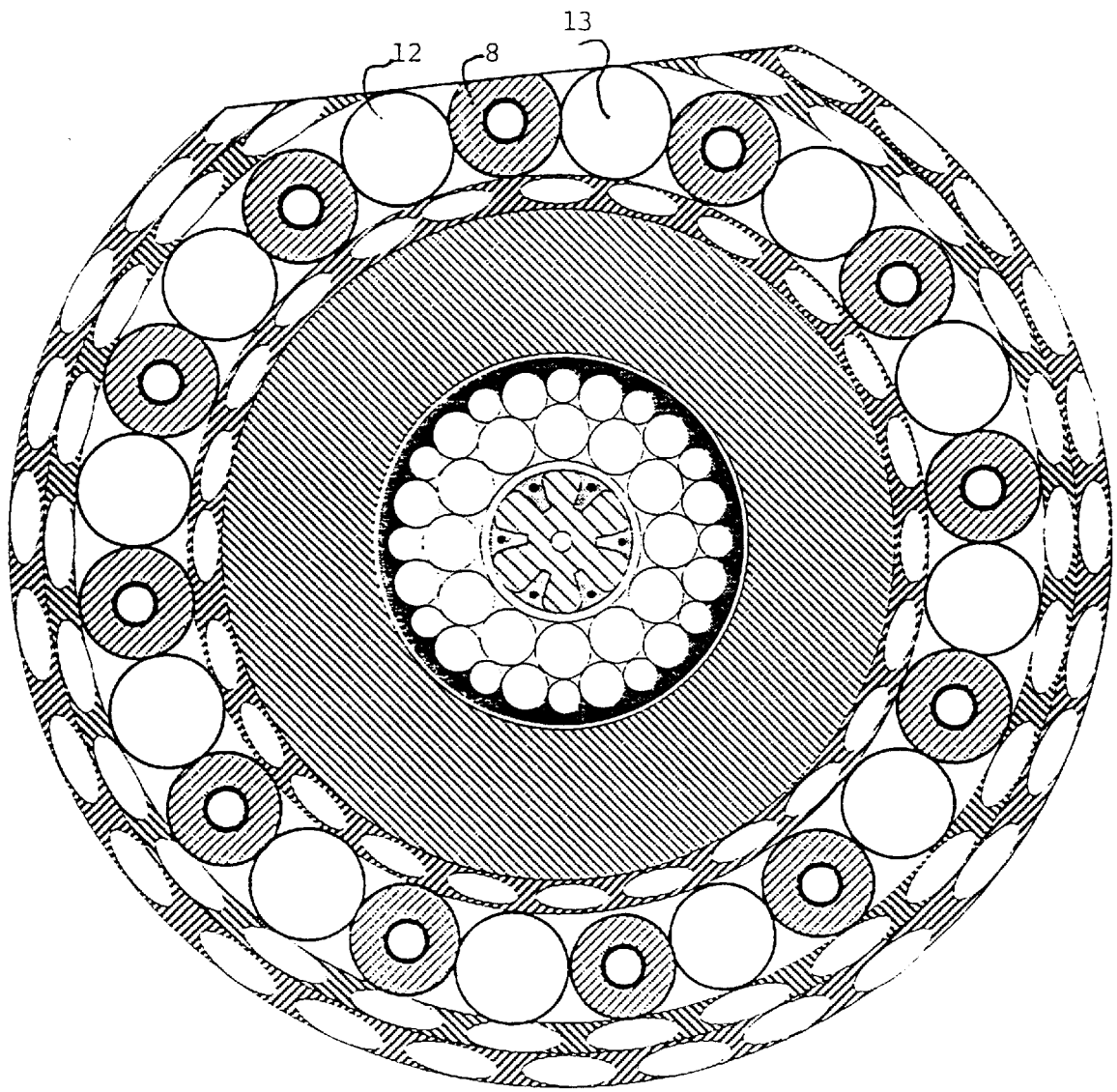
FIG. 2 shows the cable shown in FIG. 1 having been subjected to abrasion.

Referring to FIG. 2, the abrasion resistance of the cable is illustrated. As the cable is abraded, the filler 8 is rapidly abraded until it is flush with the top of the two steel wires 12 and 13 either side.

Further abrasion is slow, since the steel wires on either side must be fully worn down before significant damage to the cable can begin. The rate of wear is somewhat higher than full armour but is superior to un-armoured cable or cable protected by steel tape.

Figure 3A:
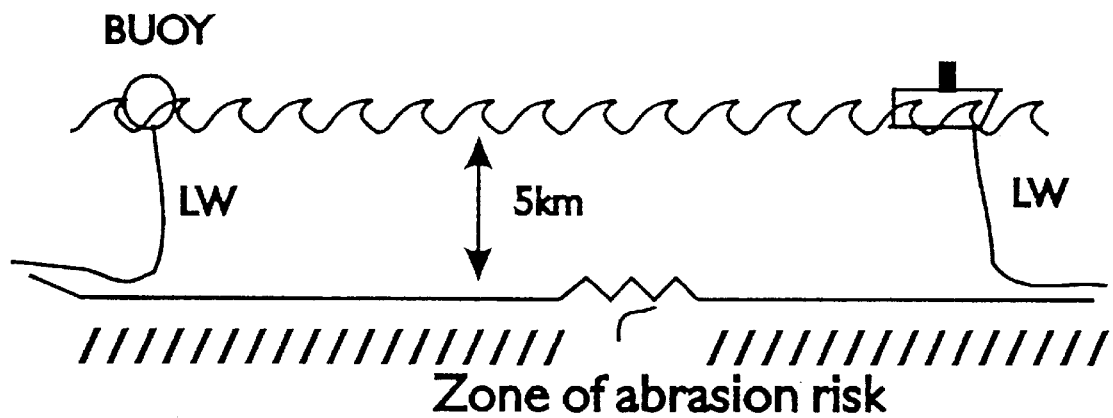
FIGS. 3a–e illustrate the utilization of the cable of the present invention in laying submarine cable.

Referring to FIGS. 3a, a light weight submarine cable LW is laid on a section of seabed which is free of abrasion risk.

Figure 3B:
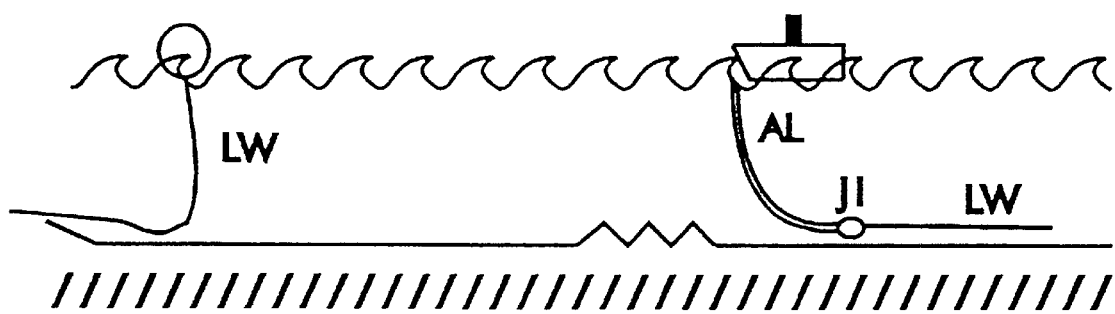

In FIGS. 3b cable LW is joined to armoured cable AL in joint J1 to traverse a section of the seabed having a zone of abrasion risk.

Figure 3C:
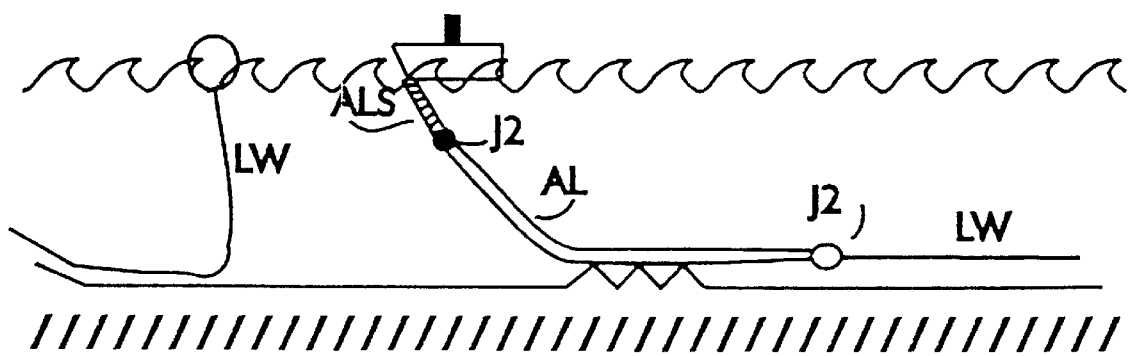

In FIG. 3c, having traversed the zone of abrasion risk, cable AL, which is now suspended from the laying vessel, 5 km above the seabed, is joined in joint J2 to the cable ALS of the present invention.

Figure 3D:
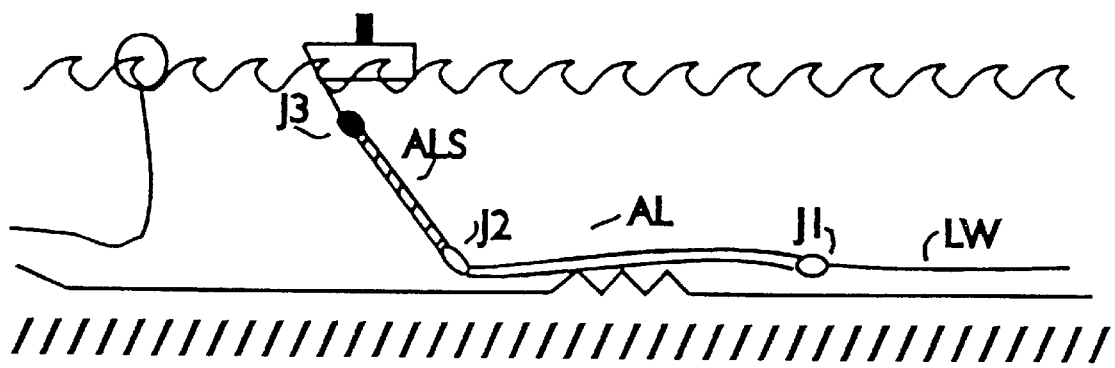
Figure 3E:
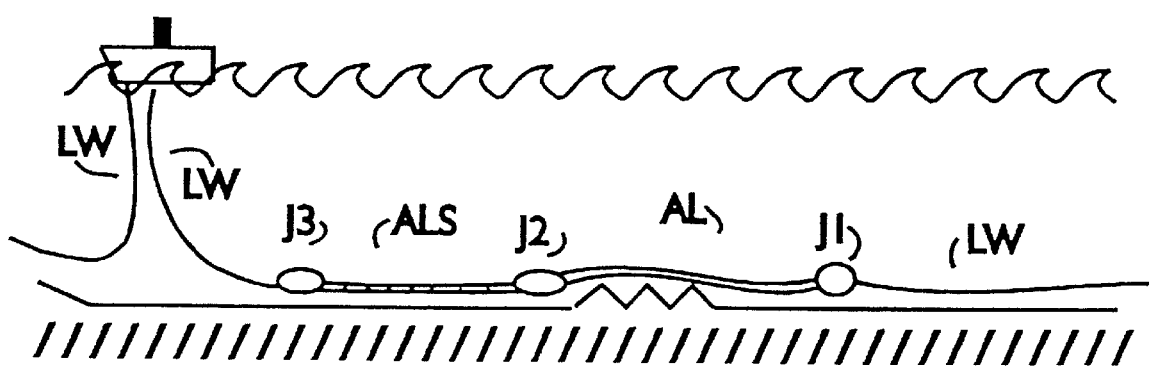

In FIG. 3d, cable ALS is joined in joint J3 to cable LW, for jointing to the final length of buoyed cable LW as shown in FIG. 3e.

The cable of the present invention bridges the weight/strength gap that exists between armoured and un-armoured cables and enables a transition from armoured cable to light cable.

I claim:

1. An electric and/or optical cable arrangement comprising an inner section that includes at least one optical fibre element and/or at least one electric conductor element, and an outer section surrounding said inner section, said outer section comprising at least one single stranded armour layer, wherein said armour layer comprises an interspersion of a plurality of metallic wire elements and a plurality of filler elements, said filler elements being of a material that has a lower weight per unit length in relation to the weight per unit length of the material of said wire elements.

2. An electric and/or optical cable arrangement as claimed in claim 1, wherein said filler elements are made from polymeric material.

3. An electric and/or optical cable arrangement as claimed in claim 1, wherein said filler elements are made from fibre reinforced polymer.

4. An electric and/or optical cable arrangement as claimed in 3, wherein the filler element contains a tensile reinforcement element.

5. An electric and/or optical cable arrangement as claimed in claim 4, wherein the tensile reinforcement element is a metallic wire core.

6. An electric and/or optical cable arrangement as claimed in claim 5, wherein the said metallic wire core is coated with a layer of polyvinyl chloride.

7. An electric and/or optical cable arrangement as claimed in claim 6, wherein the layer coating said metallic wire is attached thereto by a suitable adhesive.

8. An electric and/or optical cable arrangement as claimed in claim 7, wherein said adhesive is a solvent based elastomeric nitrile.

9. An electric and/or optical cable arrangement as claimed in claim 5, wherein the said metallic wire core is coated with a layer of polyurethane.

10. An electric and/or optical cable arrangement as claimed in claim 5, wherein the said metallic wire core is coated with a layer of high density polyethylene.

11. An electric and/or optical cable arrangement as claimed in claim 1, wherein the cross section and dimension of said filler elements are such that the metallic wire elements are maintained in a predetermined spaced relationship.

12. An electric and/or optical cable arrangement as claimed in claim 1, wherein the stranded armour layer comprises alternate metallic wire elements and filler elements.

13. An electric and/or optical cable arrangement as claimed in claim 12, wherein the cross-sectional dimensions of the metallic wire elements and the filler elements are substantially the some.

14. An electric and/or optical cable arrangement as claimed in claim 13, wherein said metallic wire elements and said filler elements are contiguous and said filler elements are a component of the overall cable circumference.

15. An electric and/or optical cable arrangement as claimed in claim 1, wherein said armour layer is covered with an outer sheath.

16. A submarine cable comprising an inner section that includes at least one optical fibre element and/or at least one electric conductor element, and an outer section surrounding said inner section, said outer section comprising at least one single stranded armour layer, wherein said armour layer comprises an interspersion of a plurality of metallic wire elements and a plurality of filler elements, said filler elements being of a material that has a lower weight per unit length in relation to the weight per unit length of the material of said wire elements.

* * * * *

UNITED STATES PATENT AND TRADEMARK OFFICE
CERTIFICATE OF CORRECTION

PATENT NO.   : 5,892,874
DATED        : April 6, 1999
INVENTOR(S)  : Houghton, Ian It is certified that error appears in the above-identified patent and that said Letters Patent is hereby corrected as shown below:

In column 4, line 8, "some" should be -- same --.

Signed and Sealed this

Twenty-fourth Day of August, 1999

Attest:

Q. TODD DICKINSON

Attesting Officer

Acting Commissioner of Patents and Trademarks